United States Patent [19]

Chandalia et al.

[11] 4,338,407
[45] Jul. 6, 1982

[54] STABILIZATION OF HIGH RESILIENCE POLYURETHANE FOAM

[75] Inventors: Kiran B. Chandalia, Cheshire; Henry G. Barnowski, Durham, both of Conn.

[73] Assignee: Olin Corporation, New Haven, Conn.

[21] Appl. No.: 239,846

[22] Filed: Mar. 2, 1981

Related U.S. Application Data

[63] Continuation-in-part of Ser. No. 6,951, Jan. 25, 1979, Pat. No. 4,278,770, which is a continuation-in-part of Ser. No. 898,274, Apr. 20, 1978, abandoned, which is a continuation-in-part of Ser. No. 881,297, Feb. 27, 1978, abandoned.

[51] Int. Cl.$^3$ .............................................. C08G 18/14
[52] U.S. Cl. ................................... 521/99; 521/106; 521/117; 521/122; 521/123; 521/124; 521/128; 521/137; 521/176
[58] Field of Search ............... 521/99, 106, 117, 122, 521/123, 124, 128, 137, 176

[56] References Cited

U.S. PATENT DOCUMENTS

| | | | |
|---|---|---|---|
| 3,004,921 | 10/1961 | Stossel | 260/2.5 AK |
| 3,021,290 | 2/1962 | Gmitter et al. | 260/2.5 AK |
| 3,024,209 | 3/1962 | Ferrigno | 260/2.5 AK |
| 3,150,109 | 9/1964 | Ferrigno | 260/2.5 AK |
| 3,298,976 | 1/1967 | Reinhart | 260/2.5 AK |
| 3,383,351 | 5/1968 | Stamberger | 260/33.2 |
| 3,396,126 | 8/1968 | Gurley, Jr. et al. | 260/2.5 AK |
| 3,441,523 | 4/1969 | Dwyer et al. | 260/2.5 AK |
| 3,467,606 | 9/1969 | Rice | 260/2.5 AH |
| 3,598,772 | 8/1971 | Hood et al. | 260/2.5 |
| 3,600,340 | 8/1971 | Patton, Jr. et al. | 260/2.5 AK |
| 3,640,920 | 2/1972 | Cear | 260/2.5 AK |
| 3,652,639 | 3/1972 | Pizzini et al. | 260/465.4 |
| 3,716,502 | 2/1973 | Loew | 260/2.5 AK |
| 3,772,222 | 11/1973 | Steward et al. | 260/2.5 AM |
| 3,772,224 | 11/1973 | Marlin et al. | 260/2.5 AM |
| 3,775,350 | 11/1973 | Juhas | 260/2.5 AK |
| 3,823,096 | 7/1974 | Fabris et al. | 260/2.5 AM |
| 3,823,201 | 7/1974 | Pizzini et al. | 260/861 |
| 3,880,780 | 4/1975 | Ridenour et al. | 260/2.5 AM |
| 3,909,464 | 9/1975 | Anorga et al. | 260/2.5 AK |
| 3,925,266 | 12/1975 | Fabris et al. | 260/2.5 AM |
| 3,926,867 | 12/1975 | Quock et al. | 260/2.5 AK |
| 3,931,062 | 1/1976 | Cobbledick | 260/2.5 AK |
| 3,931,066 | 1/1976 | Puig et al. | 260/2.5 AS |
| 3,933,701 | 1/1976 | Puig et al. | 260/2.5 AT |
| 4,005,035 | 1/1977 | Deaver | 260/2.5 AK |
| 4,022,941 | 5/1977 | Prokai et al. | 260/2.5 AH |
| 4,029,593 | 6/1977 | Schäpel et al. | 252/182 |
| 4,062,825 | 12/1977 | Watabe et al. | 260/37 N |
| 4,108,791 | 8/1978 | Wasilczyk | 252/182 |
| 4,217,422 | 8/1980 | Wasilczyk | 521/122 |

OTHER PUBLICATIONS

*Standard Method of Test for Fineness of Dispersion of Pigment Vehicle Systems*, ASTM Designation: D 1210-64, pp. 228-233 (1964).

*CHDM As a Curative in H.R. Urethane Foam*, Eastman Chem. Prod. Inc.-Tech. Serv. Lab., Customer Serv. Report #75-0032-IAD, Oct. 31, 1975.

*Primary Examiner*—Maurice J. Welsh
*Attorney, Agent, or Firm*—William D. Sabo

[57] ABSTRACT

An improvement is disclosed in the preparation of high resilience polyurethane foam. The improvement resides in the use of a select reaction mixture which includes a polyol containing an effectively dispersed finely divided solid particulate material and 1,4-cyclohexanedimethanol as a cross-linking agent to stabilize the reaction mixture.

29 Claims, No Drawings

STABILIZATION OF HIGH RESILIENCE POLYURETHANE FOAM

This application is a continuation-in-part of copending application Ser. No. 006,951, filed Jan. 25, 1979, and now U.S. Pat. No. 4,278,770, issued July 14, 1981, which in turn is a continuation-in-part of application Ser. No. 898,274, filed Apr. 20, 1978, now abandoned, which in turn is a continuation-in-part of application Ser. No. 881,297, filed Feb. 27, 1978, now abandoned.

This invention relates to the preparation of polyurethane foam; and, more particularly, to an improvement in the preparation of high resilience polyether polyurethane foam.

Polyurethane foams commonly are prepared by reacting a polyether polyol with an organic polyisocyanate in the presence of a blowing agent and a reaction catalyst. Various polyether polyols have been employed in making such foams; the resulting foam can range in physical properties from very flexible to fully rigid depending on the hydroxyl number of the chosen polyol.

In the art of making flexible polyurethane foam, it is known that by utilizing foam-forming formulations incorporating a highly reactive organic polyisocyanate and a high molecular weight polyol having a certain level of primary hydroxyl content, a foam with improved resilience and other desirable physical properties can be accomplished. Such resulting foams have come to be referred to in the art as "high resilience" foams. Resilience is defined as the ability to return to original shape and dimensions after a deforming force has been applied and removed from a body. In polyurethane foam technology, the industry generally considers "SAC factor" to be the characteristic which differentiates high resilience foams from conventional foams. This SAC factor is a measure of support provided by a cushioning material, and it represents the ratio of indentation load deflection, ILD, at 65 percent deflection to that at 25 percent deflection (per ASTM D-1564-64T). According to SPI standards, conventional foams exhibit a SAC factor of about 1.7 to about 2.2, while high resilience foams display a factor of above about 2.2 to about 3.2.

High resilience foams have found widespread application as cushioning material in furniture and bedding. Most significantly, these foams have been utilized in the automotive industry for making molded auto seats. The acceptance of these relatively new foams can be attributed to the fact that most already established polyurethane foam techniques can be readily applied to high resilience foams. However, foam stabilization and collapsing, one particular area of technology, has been found to be markedly non-transferable. Due to the highly reactive nature of the reaction mixture from which the high resilience foams are prepared, such foams have been found to exhibit characteristic pre-cure shrinkage. Conventional foam reaction mixture components which serve to stabilize the composition as it reacts, foams, and solidifies, are ineffective to prevent shrinkage or collapse in high resilience foaming reactions. Moreover, conventional stabilizers actually tend to cause severe voids, splits and shrinkage of the foam product.

Several approaches have been developed to meet the stabilization requirements of high resilience foam. See, for example, U.S. Pat. Nos. 3,880,780; 3,931,066; 3,933,701; and 4,108,791.

In order to achieve foaming stability and enhanced load bearing characteristics, it also has become popular to employ "polymer-polyol" processing systems in high resilience foam production. Such polymer-polyols, produced from ethylenically unsaturated monomers and polyols, are exemplified by the materials described in U.S. Pat. Nos. 3,383,351; 3,652,639; and 3,823,201. These polymer-polyols commonly are mixed with conventional polyether polyols and used as the starting polyol reactant.

In U.S. patent application Ser. No. 006,951, there is disclosed a process in which there is included in the reaction mixture a polyol containing a stabilizing proportion of an effectively dispersed finely divided solid particulate material. According to the process of the application, by employing such a polyol in the reaction mixture, high resilience polyurethane foam can be stabilized against pre-cure collapse or shrinkage.

Although this approach has been found to be quite satisfactory, a problem has been encountered when the polyol is blended with other reaction mixture components prior to foaming. High resilience foams are commonly prepared by employing a foam machine having two feed streams, an "A" stream containing the polyisocyanate and a "B" stream containing the polyol, foaming agent, catalyst and possibly other ingredients. When a polyol as described in the aforementioned application is utilized in the reaction mixture, the "B" blend containing the polyol can become unstable unless foaming is performed directly after the polyol is added to the other ingredients in the polyol-containing stream. As a result of this instability, the foams which are produced may demonstrate pre-cure shrinkage or collapse.

Thus, there is a need in the art for a process for preparing high resilience polyurethane foam from a reaction mixture featuring improved stabilization characteristics.

Accordingly, it is a primary object of the present invention to provide an improved process for preparing high resilience polyurethane foam.

It is a further object of the present invention to provide an improved process for preparing high resilience polyurethane foam which is stabilized against pre-cure collapse or shrinkage.

Now, it has been discovered, according to the invention, that an improvement can be achieved in preparing high resilience polyurethane foam by incorporating in the foam-forming reaction mixture a polyol containing an effectively dispersed finely divided solid particulate material and 1,4-cyclohexanedimethanol as a cross-linking agent. Foams prepared from such a reaction mixture, while exhibiting all the desirable properties of high resilience foam, are not susceptible to shrinkage or collapse, even if the polyol is blended with the other foam ingredients prior to reaction with the polyisocyanate and stored for a period of time before the reaction is carried out. As such, they are of utility in a variety of cushioning and upholstering applications, particularly in the production of automotive seats.

More in detail, in the process of the invention, there is included in the reaction mixture a polyol containing a proportion of an effectively dispersed finely divided solid particulate material, the particulate material having, prior to dispersion in the polyol, an average primary particle size of about 0.007 to about 10 microns and a pH ranging from about 3 to about 5, and further having, in a dispersion in said polyol, an effective maximum particle size of less than about 75 microns; and there is added to the reaction mixture an effective proportion of 1,4-cyclohexanedimethanol to stabilize the reaction mixture. In a particularly preferred embodiment of the invention, a synthetic hydrophobic amorphous silica is employed as the particulate material.

In the preparation of the high resilience polyurethane foams of the invention, either the so-called "one-shot method" or the "semi-prepolymer technique" may be employed, the one-shot method being generally preferred. The polyurethane foam is prepared from a reaction mixture comprised of a polyether polyol, as described hereinbelow, an organic polyisocyanate, a foaming agent and a reaction catalyst.

The polyether polyol is one that is characterized by (1) a molecular weight of at least about 1,500, (2) a polyfunctional alcohol nucleus, (3) polyoxyalkylene chain segments attached through one end thereof to the nucleus, and (4) a ratio of primary to secondary hydroxyl end groups ranging from about 1.5:1 to about 5.5:1. This polyether polyol can be prepared by methods generally well known in the art wherein a polyfunctional alcohol initiator is condensed, in the presence of an alkaline catalyst, first with an alkylene oxide having three or more carbon atoms and then with ethylene oxide.

The alcohol initiator which is used to prepare the polyether polyol can be any compound having 2–8 hydroxyl groups. Illustrative are ethylene glycol, propylene glycol, the butylene glycols such as 1,3-butylene glycol, the pentane diols such as 1,5 pentane diol, the hexane diols such as 1,6-hexane diol, glycerol, trimethylolpropane, sorbitol, pentaerythritol, methyl glucoside, sucrose, mixtures thereof and the like. It is preferred, however, to employ an aliphatic polyol having 2–4, and more preferably 3–4, hydroxyl groups, such as ethylene glycol, propylene glycol, glycerol, trimethylolpropane, sorbitol, and the like. The most preferred initiators are the aliphatic triols such as glycerol and trimethylolpropane.

In preparing the polyether polyol, a polyhydric alcohol initiator as described above is sequentially condensed, in the presence of an alkaline catalyst such as potassium hydroxide, first with an alkylene oxide having 3–8, and preferably 3–4, carbon atoms and then with ethylene oxide. Illustrative of the alkylene oxides which are first condensed with the alcohol initiator are propylene oxide, butylene oxide, pentylene oxide, mixtures thereof and the like, propylene oxide being most preferred. In carrying out the sequential condensation reactions, such amounts of ethylene oxide and higher alkylene oxide are employed as to provide a polyether polyol having a molecular weight of at least about 1,500 and preferably from about 4,000 to about 7,000, and in which the ratio of primary to secondary hydroxyl groups is from about 1.5:1 to about 5.5:1 and preferably from about 2:1 to about 5:1.

In accordance with a particularly preferred embodiment of the invention, the polyether polyol which is employed in preparing the polyurethane foam is an oxypropylated, oxyethylated aliphatic triol having a molecular weight of about 4,500–6,600 and a ratio of primary to secondary hydroxyl groups from about 3:1 to about 4.5:1.

As aforementioned, the polyether polyol contains a small proportion of effectively dispersed fine particulate material. Upon being blended into the polyol composition, however, the fine particulate material undergoes agglomeration, forming clusters of particles markedly larger than the individual particles themselves; such particle agglomerates can exhibit effective sizes more than 100 times greater than the initial size of the individual particles. High resilience foam reaction formulations containing fine particulate material which has not been selectively blended to ensure a reduced effective dispersed particle size within the critical limits, as presently defined, fail to avoid unacceptable shrinkage.

Practicing the method of the present invention, suitable fine particulate material is dispersed in the polyol composition to form a dispersion in which the fineness or effective maximum size of the particles, or particle agglomerates, in the dispersion is less than about 75 microns (e.g., per ASTM D-1210-64). Such a dispersion can be accomplished by using high shear mixers or other blending equipment which effectively eliminates agglomerates or reduces the particle agglomerate size to form a polyol composition featuring dispersed particle characteristics within the specified critical range. Preferably, the effective particle size in dispersion is less than about 50 microns, and most preferably about 25 microns or less. An effective maximum particle size in dispersion ranging between about 10 to about 20 microns has been found to be particularly preferred.

The particulate materials that are utilized according to the present invented method are select, finely divided, solid particles that are compatible with, but insoluble in, the foam reaction mixture. Preferably, the particles have an average primary particle size of less than about 75 microns, a surface area of at least about 30 $m^2/g$, and exhibit a bulk density of from about 1 to about 65 lbs./ft.$^3$. Naturally occurring materials meeting such physical criteria are not commonly available, but suitable particulate material can be synthetically prepared by known methods. Illustrative of particulate materials that can be used are: non-metal oxides based on non-metals such as silicon and phosphorus, for example, silicon dioxide, phosphates and phosphites; metal oxides, metal silicates and metal salts, based on metals such as magnesium, calcium, titanium, barium, aluminum, iron, copper, and zinc; solid organic polymers, such as polystyrene, polyacrylonitrile, polyvinylalcohols, polyvinylchloride and copolymers thereof; solid inorganic polymers, such as polymeric metal alkoxides including polyorganosiloxanometalloxanes (e.g, polytriethylsiloxanoaluminoxane, and polytrimethylsiloxanotitanoxane), and silicones; graphite; carbon; and organic pigments, such as common paint pigments, including phthalocyanines. Particulate carbon (e.g., channel black) and inert metal and non-metal oxide particles, such as can be produced by hydrolysis of metal and non-metal chlorides in an oxygen-hydrogen flame (e.g., U.S. Pat. Nos. 3,083,115; 3,086,851; and 3,103,495), are preferred. Particularly preferred are silicon dioxides (e.g., synthetic amorphous silica, hydrophilic or modified hydrophobic), titanium dioxides and aluminum oxides, such as are commercially available under the trademark "AEROSIL" from Degussa Corporation, under the trademark "CAB-O-SIL" from Cabot Corporation and under the trademark "SYLOID" from W. R. Grace Co. Such inert oxides featuring an average primary particle size of about 0.007 to about 10 microns, having a surface area of about 50 to about 400 $m^2/g$, having a pH ranging from about 3 to about 5, and with a bulk density of from about 1 to about 10 lbs./ft.$^3$ are most preferred.

According to the present invention, at any step in the preparation of the foam ingredients, a small proportion of select fine particulate materials is blended into the polyol reactant composition in a manner to effectively disperse the particles as described hereinabove. While this particulate agent may be added in any suitable amount for a particular formulation, it has been found preferable to employ the agent in an amount ranging from about 0.1 to about 5.0 percent, based on the polyether polyol weight. Most preferably, about 0.25 to about 1.0 percent of the particulate agent is used.

In preparing the foams of the invention, any suitable organic polyisocyanate, or a mixture of polyisocyanates, may be employed in the reaction mixture. Illustrative are toluene diisocyanate, such as the 80:20 and the 65:35 mixtures of the 2,4- and 2,6-isomers, ethylene diisocyanate, propylene diisocyanate, methylene-bis (4-phenyl) isocyanate, 3,3'-ditoluene-4,4'-diisocyanate, hexamethylene diisocyanate, naphthalene-1,5-diisocyanate, polymethylene polyphenyl isocyanate, mixtures thereof, and the like. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20.

The total amount of polyisocyanates that is employed should generally be sufficient to provide at least 0.7 NCO group per hydroxyl group in the reaction system, which includes the polyether polyol, as well as any additional material and/or foaming agent present in the system. However, in practice, such a proportion of polyisocyanate is usually employed as to provide no more than about 1.25, and preferably about 0.9–1.15, NCO groups per each hydroxyl group.

Any suitable foaming agent, or mixture of foaming agents, may be employed in preparing the polyurethane foam. These include inorganic foaming agents, such as water, and organic foaming agents containing up to seven carbon atoms, such as the halogenated hydrocarbons and the low molecular weight alkanes, alkenes, and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether and diisopropyl ether. Water and the low molecular weight polyhalogenated alkanes, such as monofluorotrichloromethane and dichlorodifluoromethane, are preferred. The amount of foaming agent may be varied within a reasonably wide range as is well known in the art. Generally, however, the halogenated alkanes, for example, are employed in an amount of about 2–20 parts per 100 parts by weight of the polyether polyol; and water is employed in an amount of about 1–6 parts per 100 parts by weight of the polyether polyol.

The catalyst employed in preparing the foams of the invention may be any of the catalysts known to be useful for this purpose, including tertiary amines, organo-metallic salts, and mixtures of an organo-metallic salt with one or more tertiary amine, the latter being preferred. Typical tertiary amines include, for example, triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark "Niax A-1", methyldicyclohexylamine, N-cyclohexylmorpholine, dimethylcyclohexylamine, methyldiethanolamine, mixtures of dimethylcyclohexylamine and 2(3-pentyl)-1-dimethylaminocyclohexane such as may be purchased commercially under the trademark "Polycat", bis(dimethylaminoethylpropylether), mixtures of triethylene diamine and dipropylene glycol such as the 1:2 and 1:4 weight ratio mixtures which may be purchased commercially under the trademarks "Dabco 33LV" and "Dabco 8020", respectively, bis(dimethylaminopropylether), and mixtures of these catalysts. The preferred tertiary amine catalysts are triethylene diamine, mixtures of bis(dimethylaminoethylether) and dipropylene glycol, dimethylcyclohexylamine alone or as a mixture thereof with 2(3-pentyl)-1-dimethylaminocyclohexane. The tertiary amine catalyst is used in a proportion of about 0.1–1.5, and preferably about 0.25–0.75, parts per 100 parts by weight of the polyether polyol which is employed in preparing the foam.

Typical organo-metallic salts include, for example, the salts of tin, titanium, antimony, aluminum, cobalt, zinc, bismuth, lead, and cadmium, the tin salts, i.e., stannic and stannous salts, being preferred. Illustratively, such salts include the octoates, dilaurates, diacetates, dioctoates, oleates, and neodeconates of these metals, the octoates being preferred. The organo-metallic salt catalyst is used in a proportion of about 0–0.5, and preferably about 0.05–0.2, part per 100 parts by weight of the polyether polyol which is employed in the preparation of the foam.

It is preferred in the preparation of polyurethane foams of the invention to employ minor amounts of a conventional surfactant in order to further improve the cell structure of the polyurethane foam. Suitable such surfactants include, for example, the silicon-based surfactants such as the silicones and the siloxaneoxyalkylene block copolymers, all of which are commercially available materials. Generally, the silicones are employed in a proportion of up to about 0.1 part per 100 parts by weight of the polyether polyol; and the siloxaneoxyalkylene block copolymers are employed in a proportion of up to about 2 parts per 100 parts by weight of the polyether polyol.

If desired, a curing agent, such as a conventional amine curing agent, may be included in the foam-forming reaction mixture. However, pursuant to the present invention, the use of curing agents is not necessary, and therefore it is preferable to exclude such materials from the reaction mixture.

Various additives can also be employed to provide different properties in the polyurethane foam, e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants, antioxidants and flame retardants may be added.

In accordance with the present invention, there is added to the foam-forming formulation, a proportion of 1,4-cyclohexanedimethanol to serve as a cross-linking agent. It has been found that by adding a small amount of 1,4-cyclohexanedimethanol to the formulation, a substantial improvement in foam stabilization can be achieved. While the exact reason is unknown, it is believed that the solid particulate material has a tendency to re-agglomerate if the polyol is mixed with other ingredients prior to foaming, and that the addition of the 1,4-cyclohexanedimethanol to the polyol-containing blend deters re-agglomeration of the particles. If the solid particles re-agglomerate to a particle size in excess of the critical particle size limits as defined hereinabove, the formulation may produce foams demonstrating unacceptable shrinkage or collapse. However, whatever the reason, it is a surprising discovery of the present invention, that a substantial improvement in stabilization of the foam against pre-cure collapse or shrinkage is effected.

In practicing the method of the invention for the preparation of high resilience polyurethane foam, the 1,4-cyclohexanedimethanol compound may be employed in any suitable proportion which is effective in stabilizing the reaction mixture from pre-cure collapse or shrinkage without otherwise materially altering the basic properties of the foam. Thus, the term "effective proportion", as used in the specification and claims herein, is intended to encompass any such proportion. Illustratively, the proportion ranges from about 0.5 to about 10, and preferably about 0.5 to about 5, parts per 100 parts by weight of the polyether polyol.

Foams prepared in accordance with the principles of the present invention are characterized by favorable processing characteristics and physical properties. The foams are substantially open-celled and become tack-free within a relatively short period of time after foaming cessation. Generally ranging in density from about 1.0 to about 5.0, preferably from about 1.7 to about 3.0, pounds per cubic foot, the cured foams feature a SAC factor in excess of 2.2, generally ranging from about 2.3 to about 3.0, and a ball rebound generally greater than about 55 percent. These high resilience foams are flexible and soft and exhibit little or no tendency to bottom out. In combination with good tear strength, tensile strength and elongation, the physical properties of the foams of the invention make them desirable for a variety of cushioning utilities.

The following examples are provided to illustrate the invention. In these examples, all parts and percentages are by weight unless otherwise specified.

PREPARATION OF POLYOL CONTAINING PARTICULATE DISPERSION

EXAMPLE 1

100 Grams of synthetic fumed silica, hydrophilic grade, were added to 1,900 grams of a polyether polyol and mixed for about 15 minutes using a high shear mixer. The silica, obtained commercially under the trademark Cab-O-Sil Grade PTG from Cabot Corporation, is reported to have a pH of 3.5-4.2 and a primary particle size of 14 millimicrons. The polyether polyol had a molecular weight of about 4,600 and was prepared by end-capping a propoxylated glycerin precursor with 15 moles of ethylene oxide to a final hydroxyl number of about 36. The effective maximum size of the particles and/or particle agglomerates in dispersion was measured, using a grind gauge, per ASTM D-1210-64, to be less than about 15 microns.

EXAMPLE 2

100 Grams of synthetic fumed silica, hydrophobic grade, were added to 1,900 grams of a polyether polyol and mixed for about 15 minutes using a high shear mixer. The silica, obtained commercially under the trademark Aerosil R-972 from Degussa Corporation, is reported to have a pH of 3.5-4.1 and a primary particle size of 16 millimicrons. The polyether polyol had a molecular weight of about 4,600 and was prepared by end-capping a propoxylated glycerin precursor with 15 moles of ethylene oxide to a final hydroxyl number of about 36. The effective maximum size of the particles and/or particle agglomerates in dispersion was measured, using a grind gauge, per ASTM D-1210-64, to be about 40 microns or less.

PREPARATION OF FOAM FORMULATIONS

EXAMPLES 3-5 AND COMPARATIVE EXAMPLE A

Polyurethane foam formulations containing "A" and "B" blends were prepared. In these formulations, there were employed the ingredients in the proportions indicated in Table I.

TABLE I
FOAM FORMULATIONS

| Reaction Mixture Ingredients | Example 3 | Example 4 | Example 5 | Comparative Example A |
|---|---|---|---|---|
| Part "A" | | | | |
| Toluene Diisocyanate ①, Index | 102 | 102 | 102 | 102 |
| Part "B" | | | | |
| Polyol ② | 66 | 58 | 58 | 79 |
| Product of Example ① | 9 | 17 | — | 9 |
| Product of Example ② | — | — | 17 | — |
| Surfactant ③ | 1.0 | 1.0 | 1.0 | 1.0 |
| Diethanolamine | 0.5 | 0.5 | 0.5 | 0.5 |
| Water | 3.5 | 3.5 | 3.5 | 3.5 |
| Triethylene Diamine ④ | 0.5 | 0.5 | 0.5 | 0.5 |
| Tertiary Amine Catalyst ⑤ | 0.12 | 0.12 | 0.12 | 0.12 |
| Tin Catalyst ⑥ | 0.005 | 0.005 | 0.005 | 0.005 |
| Polyol ⑦ | — | — | — | 7 |
| Polyol ⑧ | — | — | — | 5 |
| Cross-Linker ⑨ | 25 | 25 | 25 | — |

① A mixture of toluene diisocyanate isomers (80:20 mixture of 2,4/2,6-isomers).
② A polyether triol having a molecular weight of 4,600, prepared by KOH catalyzed oxyalkylation of glycerin first with propylene oxide and then end-capped with 15 moles of ethylene oxide.
③ Commercially available under the trademark "DC 556" from Dow Corning.
④ Commercially available under the trademark "DABCO 33LV", consisting primarily of triethylene diamine (⅓) and dipropylene glycol (⅔).
⑤ Commercially available under the trademark "NIAX A-1" from Union Carbide Corporation.
⑥ Commercially available under the trademark "WITCO UL-1" from Witco Chemical Corporation.
⑦ A polyether diol having a molecular weight of 2,000, prepared by KOH catalyzed propoxylation of dipropylene glycol.
⑧ A polyether polyol having a hydroxyl number of 375, prepared by KOH catalyzed propoxylation of a 3/1 blend of dextrose/glycerin.
⑨ A mixture of 10 parts of 1,4-cyclohexanedimethanol with 90 parts of a polyether triol having a molecular weight of 4,600, prepared by KOH catalyzed oxyalkylation of glycerin first with propylene oxide and then end-capped with 15 moles of ethylene oxide.

EXAMPLES 6-23 AND COMPARATIVE EXAMPLES B AND C

A series of examples was performed to demonstrate the effect of dispersed particle size and a cross-linker on foam stabilization. In the examples, the foams were prepared, according to the formulations reported in Table I. Each formulation was hand mixed at room temperature and subsequently poured into an aluminum mold (15½"×15½"×4½") and heated to 140°-150° F. At the end of foam rise, the mold was placed in an oven at 260° F. for six minutes. The resulting foam was thereafter subjected to testing to determine the shrink characteristics.

To determine the extent of shrinkage, each foam was allowed to shrink for 30 minutes after removal from the mold. The amount of shrinkage which occurred was measured for each foam, and a rating was assigned depending upon the extent of shrinkage as follows:

| Shrink Rating | Foam Shrinkage (Volume Percent) |
|---|---|
| 1 | 0–12% |
| 2 | 13–24 |
| 3 | 25–36 |
| 4 | 37–48 |
| 5 | above 48 |

As a measure of "B" blend stability, each formulation in Table I was foamed within two minutes after being mixed (0-time), and the various formulations were foamed at various times thereafter. The results, which are set forth in Table II, show the enhanced stability when 1,4-cyclohexanedimethanol is present in the formulation.

TABLE II

FOAM SHRINK RATING

| Example | Formulation | Time (Days) | Shrink Rating |
|---|---|---|---|
| 6 | Example 3 | 0 | 1 |
| 7 | Example 3 | 3 | 1 |
| 8 | Example 3 | 8 | 4 |
| 9 | Example 3 | 15 | 4 |
| 10 | Example 3 | 21 | 3½ |
| 11 | Example 3 | 28 | 3 |
| 12 | Example 4 | 0 | 1 |
| 13 | Example 4 | 3 | 1 |
| 14 | Example 4 | 8 | 1 |
| 15 | Example 4 | 15 | 2 |
| 16 | Example 4 | 21 | 2 |
| 17 | Example 4 | 28 | 1½ |
| 18 | Example 5 | 0 | 1 |
| 19 | Example 5 | 1 | 1 |
| 20 | Example 5 | 8 | 1 |
| 21 | Example 5 | 15 | 1 |
| 22 | Example 5 | 20 | 1 |
| 23 | Example 5 | 27 | 1 |
| B | Comparative Example A | 0 | 1½ |
| C | Comparative Example A | 1 | 5 |

EXAMPLES 24–30

A study was performed to determine the processing lattitude afforded by formulations in which 1,4-cyclohexanedimethanol was employed as a cross-linker. The degree of processing lattitude was determined by varying the concentration of diethanolamine within the formulations tested. If the diethanolamine concentration can be varied over a wide range without producing unacceptable foams, a wide processing lattitude is indicated. This characteristic is very important in the production of high resilience foams.

Foams were prepared, according to the formulations in Examples 24–30, as indicated in Table III below, using a foam machine (manufactured by Martin Sweet, Louisville, Ky.) with a throughput of 65 pounds per minute. The foam machine had two streams, an "A" side containing diisocyanate and a "B" blend containing the other ingredients in the formulation. The "B" blend was aged for about 24 hours prior to foaming.

Two basic formulations, one in Examples 24–26 and the other in Examples 27–30, were utilized; and the amount of diethanolamine in each of the basic formulations was varied to determine the diethanolamine range.

In Examples 24–26, synthetic fumed silica, hydrophilic grade, was used in preparing high resilience foams; and in Examples 27–30, synthetic fumed silica, hydrophobic grade, was employed in making high resilience foams. The results reported in Table IV show that improved processing lattitude is achieved by using a hydrophobic grade of synthetic fumed silica.

TABLE III

FOAM PROCESSING LATTITUDE

| Reaction Mixture Ingredients | 24 | 25 | 26 | 27 | 28 | 29 | 30 |
|---|---|---|---|---|---|---|---|
| Part "A" | | | | | | | |
| Toluene Diisocyanate ①, Index | 102 | 102 | 102 | 102 | 102 | 102 | 102 |
| Part "B" | | | | | | | |
| Polyol ② | 97.05 | 97.05 | 97.05 | 97.05 | 97.05 | 97.05 | 97.05 |
| Dispersed Silica ③ | 0.45 | 0.45 | 0.45 | — | — | — | — |
| Dispersed Silica ④ | — | — | — | 0.45 | 0.45 | 0.45 | 0.45 |
| Triethylene Diamine ⑤ | 0.50 | 0.50 | 0.50 | 0.50 | 0.50 | 0.50 | 0.50 |
| Tertiary Amine Catalyst ⑥ | 0.12 | 0.12 | 0.12 | 0.12 | 0.12 | 0.12 | 0.12 |
| Surfactant ⑦ | 1.00 | 1.00 | 1.00 | 1.00 | 1.00 | 1.00 | 1.00 |
| Water | 3.00 | 3.00 | 3.00 | 3.00 | 3.00 | 3.00 | 3.00 |
| Tin Catalyst ⑧ | 0.01 | 0.01 | 0.01 | 0.01 | 0.01 | 0.01 | 0.01 |
| Cross-Linker ⑨ | 2.50 | 2.50 | 2.50 | 2.50 | 2.50 | 2.50 | 2.50 |
| Diethanolamine | 0.2 | 0.4 | 0.6 | 0.3 | 0.4 | 0.6 | 1.25 |

① A mixture of toluene diisocyanate isomers (80:20 mixture of 2,4/2,6-isomers).
② A polyether triol having a molecular weight of 4,600, prepared by KOH catalyzed oxyalkylation of glycerin first with propylene oxide and then end-capped with 15 moles of ethylene oxide.
③ Synthetic fumed silica, hydrophilic grade, commercially available under the trademark "Cab-O-Sil PTG" from Cabot Corporation.
④ Synthetic fumed silica, hydrophobic grade, commercially available under the trademark "Aerosil R-972" from Degussa Corporation.
⑤ Commercially available under the trademark "DABCO 33LV", consisting primarily of triethylene diamine (⅓) and dipropylene glycol (⅔).
⑥ Commercially available under the trademark "NIAX A-1" from Union Carbide Corporation.
⑦ Commercially available under the trademark "DC 556" from Dow Corning.
⑧ Commercially available under the trademark "WITCO UL-1" from Witco Chemical Corporation.
⑨ 1,4-Cyclohexanedimethanol.

TABLE IV

DIETHANOLAMINE RANGE STUDIES

| Example | Diethanolamine Concentration | Observations |
|---|---|---|
| 24 | 0.2 | Foam collapsed. |
| 25 | 0.4 | Shrink Rating 2½. |
| 26 | 0.6 | Shrink Rating 4. |
| 27 | 0.3 | Some voids. |
| 28 | 0.4 | Foam did not collapse or shrink. |
| 29 | 0.6 | Shrink Rating 2. |
| 30 | 1.25 | Shrink Rating 3. |

We claim:
1. In a process for preparing a high resilience polyurethane foam from a reaction mixture comprising:
   (a) a polyether polyol having a molecular weight of at least about 1,500, a polyhydroxy alcohol nucleus having a functionality from about 2 to about 8, polyoxyalkylene chain segments attached to said nucleus, and a ratio of primary to secondary hydroxyl end groups ranging from about 1.5:1 to about 5.5:1;
   (b) an organic polyisocyanate;
   (c) a foaming agent; and
   (d) a reaction catalyst;
   said process including the steps of:
   including in said reaction mixture a polyol containing a proportion of an effectively dispersed finely di- vided solid particulate material, said particulate material having, prior to dispersion in said polyol, an average primary particle size of about 0.007 to about 10 microns and a pH ranging from about 3 to about 5, and further having, in dispersion in said polyol, an effective maximum particle size of less than about 75 microns; and adding to said reaction mixture an effective proportion of 1,4-cyclohexanedimethanol to stabilize said reaction mixture.

2. The process of claim 1 wherein said particulate material is dispersed to an effective particle size in dispersion of less than about 50 microns.

3. The process of claim 2 wherein said particulate material is dispersed to an effective particle size in dispersion of less than about 25 microns.

4. The process of claim 1 wherein said particulate material is added in a proportion ranging from about 0.1 to about 5.0 percent, by weight, based on polyether polyol weight.

5. The process of claim 4 wherein said proportion ranges from about 0.25 to about 1.0 percent.

6. The process of claim 1 wherein said 1,4-cyclohexanedimethanol is added in a stabilizing amount ranging from about 0.5 to about 10 parts per 100 parts by weight of said polyether polyol.

7. The process of claim 6 wherein said stabilizing amount ranges from about 0.5 to about 5 parts.

8. The process of claim 1 wherein said finely divided solid particulate material is selected from the group consisting of non-metal oxides, metal oxides, metal silicates, metal salts, solid organic polymers, solid inorganic polymers, graphite, carbon, organic pigments, and mixtures thereof.

9. The process of claim 8 wherein said particulate material is selected from the group consisting of synthetic silicon dioxide, titanium dioxide, aluminum oxide, and mixtures thereof.

10. The process of claim 9 wherein said particulate material is a synthetic amorphous silica.

11. The process of claim 10 wherein said particulate material is a synthetic hydrophobic amorphous silica.

12. The process of claim 8 wherein, prior to dispersion into said polyol, said particulate material has a surface area of about 50 to about 400 $m^2/g$, and a bulk density of about 1 to about 10 lbs./$ft.^3$.

13. The process of claim 1 wherein said polyether polyol reactant has a molecular weight of about 4,000 to about 7,000, and a ratio of primary to secondary hydroxyl end groups ranging from about 2:1 to about 5:1.

14. The process of claim 11 wherein said polyether polyol reactant is a triol having a molecular weight of about 4,500 to about 6,600, and a ratio of primary to secondary hydroxyl end groups ranging from about 3:1 to about 4.5:1.

15. The process of claim 13 including about 0.1 to about 5.0 percent of said particulate material selected from silicon dioxide, titanium dioxide, aluminum oxide, and mixtures thereof, said particulate material having a surface area of about 50 to about 400 $m^2/g$, and a bulk density of about 1 to about 10 lbs./$ft.^3$, and being dispersed to an effective maximum particle size in dispersion in the range of about 10 to about 20 microns.

16. A polyurethane foam prepared according to the process of claim 1.

17. A polyurethane foam prepared according to the process of claim 11.

18. A polyurethane foam prepared according to the process of claim 12.

19. A polyurethane foam prepared according to the process of claim 15.

20. A two-part reaction formulation for use in preparing a high resilience polyurethane foam, comprising:

an "A" part which includes an organic polyisocyanate; and a "B" part which includes:

a polyether polyol having a molecular weight of at least about 1,500, a polyhydroxy alcohol nucleus having a functionality from about 2 to about 8, polyoxyalkylene chain segments attached to said nucleus, and a ratio of primary to secondary hydroxyl end groups ranging from about 1.5:1 to about 5.5:1, said polyol containing a proportion of an effectively dispersed finely divided solid particulate material, said particulate material having, prior to dispersion in said polyol, an average primary particle size of about 0.007 to about 10 microns and a pH ranging from about 3 to about 5, and further having, in dispersion in said polyol, an effective maximum particle size of less than about 75 microns;

a foaming agent;

a reaction catalyst; and an effective proportion of 1,4-cyclohexanedimethanol to stabilize said reaction mixture.

21. The formulation of claim 20 wherein said particulate material is dispersed to an effective particle size in dispersion of less than about 50 microns.

22. The formulation of claim 21 wherein said particulate material is dispersed to an effective particle size in dispersion of less than about 25 microns.

23. The formulation of claim 20 wherein said 1,4-cyclohexanedimethanol is added in a stabilizing amount ranging from about 0.5 to about 10 parts per 100 parts by weight of said polyether polyol.

24. The formulation of claim 23 wherein said stabilizing amount ranges from about 0.5 to about 5 parts.

25. The formulation of claim 20 wherein said finely divided solid particulate material is selected from the group consisting of non-metal oxides, metal oxides, metal silicates, metal salts, solid organic polymers, solid inorganic polymers, graphite, carbon, organic pigments, and mixtures thereof.

26. The formulation of claim 25 wherein said particulate material is selected from the group consisting of synthetic silicon dioxide, titanium dioxide, aluminum oxide, and mixtures thereof.

27. The formulation of claim 26 wherein said particulate material is a synthetic amorphous silica.

28. The formulation of claim 27 wherein said particulate material is a synthetic hydrophobic amorphous silica.

29. The formulation of claim 28 wherein said particulate material has, prior to dispersion in said polyol, a surface area of about 50 to about 400 $m^2/g$, and a bulk density of about 1 to about 10 lbs./$ft.^3$, and further has, in dispersion in said polyol, an effective maximum particle size ranging from about 10 to about 20 microns.

* * * * *